US 11,616,388 B1

United States Patent
Chen et al.

(10) Patent No.: US 11,616,388 B1
(45) Date of Patent: Mar. 28, 2023

(54) UNINTERRUPTIBLE POWER APPARATUS WITH FUNCTION OF FORCED DISCONNECTION PATH AND METHOD OF FORCING DISCONNECTION PATH THEREOF

(71) Applicant: DELTA ELECTRONICS, INC., Taoyuan (TW)

(72) Inventors: Hsin-Chih Chen, Taoyuan (TW); Chao-Lung Kuo, Taoyuan (TW); Yi-Ping Hsieh, Taoyuan (TW); Hung-Chieh Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/570,101

(22) Filed: Jan. 6, 2022

(30) Foreign Application Priority Data

Nov. 3, 2021 (CN) .......................... 202111294513.4

(51) Int. Cl.
  *H02J 3/00* (2006.01)
  *H02J 9/06* (2006.01)
  *H02J 7/00* (2006.01)

(52) U.S. Cl.
  CPC ............ *H02J 9/062* (2013.01); *H02J 3/0012* (2020.01); *H02J 7/0031* (2013.01); *H02J 7/00711* (2020.01)

(58) Field of Classification Search
  CPC ........ H02J 9/062; H02J 3/0012; H02J 7/0031; H02J 7/00711
  USPC ........................................................... 307/64
  See application file for complete search history.

(56) References Cited

U.S. PATENT DOCUMENTS

| | | | |
|---|---|---|---|
| 2021/0036698 A1* | 2/2021 | Nakano | H03K 17/0824 |
| 2022/0190637 A1* | 6/2022 | Shigeta | H02J 9/062 |

FOREIGN PATENT DOCUMENTS

TW              571479 B      1/2004

* cited by examiner

*Primary Examiner* — Richard Tan
(74) *Attorney, Agent, or Firm* — Muncy, Geissler, Olds & Lowe, P.C.

(57) ABSTRACT

An uninterruptible power apparatus with a function of forced disconnection path is coupled between a grid and a load, and the uninterruptible power apparatus includes a bypass path, a power conversion module, a current detection unit, and a control module. The bypass path includes a switch unit, and the power conversion module is connected in parallel to the bypass path. The current detection unit detects a current flowing through the bypass path and transmits a current signal to the control module. The control module provides a turned-off signal to the switch unit when a first voltage of the grid is abnormal, and transmits a polarity of the current signal. The power conversion module generates a compensation amount according to the polarity, and generates an output voltage command according to the compensation amount and a voltage at an input terminal or an output terminal of the power conversion module.

15 Claims, 6 Drawing Sheets

UNINTERRUPTIBLE POWER APPARATUS WITH FUNCTION OF FORCED DISCONNECTION PATH AND METHOD OF FORCING DISCONNECTION PATH THEREOF

BACKGROUND

Technical Field

The present disclosure relates to an uninterruptible power apparatus and a method of controlling the same, and more particularly to an uninterruptible power apparatus with a function of forced disconnection path and a method of forcing disconnection path thereof.

Description of Related Art

The statements in this section merely provide background information related to the present disclosure and do not necessarily constitute prior art.

Due to the increasing popularity of key electronic systems (such as servers, central control systems, etc.) in the present electronic system field, the continuity and stability of power supply are getting more and more attention. Most of today's solutions will be equipped with uninterruptible power apparatus to meet the requirements of key electronic systems. Take the conventional uninterruptible power apparatus 100 in FIG. 1 as an example, the uninterruptible power apparatus 100 includes a bypass path 1 and a power conversion module 22, and the power conversion module 22 is connected to the bypass path 1 in parallel. The bypass path 1 includes a switch unit 12, and the switch unit 12 includes a first thyristor 122 and a second thyristor 124 connected in anti-parallel. The grid 200 provides a voltage V1 to the load terminal 100-2 through the grid terminal 100-1 and the switch unit 12. When the grid 200 fails, the uninterruptible power apparatus 100 controls the switch unit 12 to be turned off, and controls the power conversion module 22 to provide the second voltage V2 to provide backup (redundant) power to the load 300.

However, the characteristics of the thyristor will cause the switching unit 12 failing to be turned off smoothly, and grid faults are usually accompanied by phase shifts, which may cause the bypass path 1 to be disconnected after several AC cycles, resulting in the risk of insufficient stability of the entire uninterruptible power apparatus 100. Specifically, since when there is current flowing through the thyristor, the thyristor cannot be turned off quickly, when the grid 200 fails, usually the first thyristor 122 or the second thyristor 124 still has current flowing and cannot be quickly turned off. It is necessary to wait until the thyristor has no current flowing through itself before the thyristor can be turned off smoothly.

SUMMARY

In order to solve the above problems, the present disclosure provides an uninterruptible power apparatus with a function of forced disconnection path. The uninterruptible power apparatus is coupled between a grid and a load, and the uninterruptible power apparatus includes a bypass path, at least one power conversion module, a current detection unit, and a control module. The bypass path is coupled to the grid through a grid terminal and is coupled to the load through a load terminal. The bypass path includes at least one switch unit, and the at least one switch includes a first thyristor and a second thyristor connected in anti-parallel. The bypass path receives a first voltage through the grid terminal and transmits the first voltage to the load terminal. The at least one power conversion module includes an input terminal and an output terminal. The input terminal is coupled to the grid terminal, and the output terminal is coupled to the load terminal. The current detection unit is coupled to the bypass path, and detects a current flowing through the bypass path to correspondingly transmit a current signal. The control module is coupled to the current detection unit and the at least one power conversion module. When the first voltage is abnormal, the control module provides a turned-off signal to the first thyristor and the second thyristor, and transmits a polarity of the current signal to the at least one power conversion module. The at least one power conversion module generates a compensation amount according to the polarity, and generates an output voltage command according to the compensation amount and an input voltage at the input terminal or an output voltage at the output terminal.

In order to solve the above problems, the present disclosure provides a method of forcing disconnection path of an uninterruptible power apparatus. The uninterruptible power apparatus includes a bypass path and at least one power conversion module, and the bypass path is coupled to a grid and a load. The bypass path includes at least one switch unit, and the at least one switch unit includes a first thyristor and a second thyristor connected in anti-parallel. The bypass path receives a first voltage through a grid terminal and transmits the first voltage to a load terminal. The method of forcing disconnection path includes steps of: (a) realizing that the first voltage is abnormal; (b) providing a turned-off signal to the first thyristor and the second thyristor according to the abnormality of the first voltage, and transmitting a polarity of a current flowing through the bypass path to the at least one power conversion module; (c) controlling the at least one power conversion module to provide a second voltage to the load terminal, and the second voltage is the sum of a voltage at an input terminal or at an output terminal of the at least one power conversion module and a compensation voltage; (d) controlling the at least one power conversion module to provide the second voltage to the load terminal, and the second voltage is corresponding to the first voltage under the normality. The main purpose and effect of the present disclosure is that the uninterruptible power apparatus of the present disclosure uses the control module to control the power conversion module to provide the reverse-biased voltage to the thyristor that has not been turned off when the voltage provided by the grid is abnormal. The reverse-biased voltage can be used to reversely bias the thyristor that has not turned off to ensure that the bypass path is successfully disconnected when the abnormal cycle occurs.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
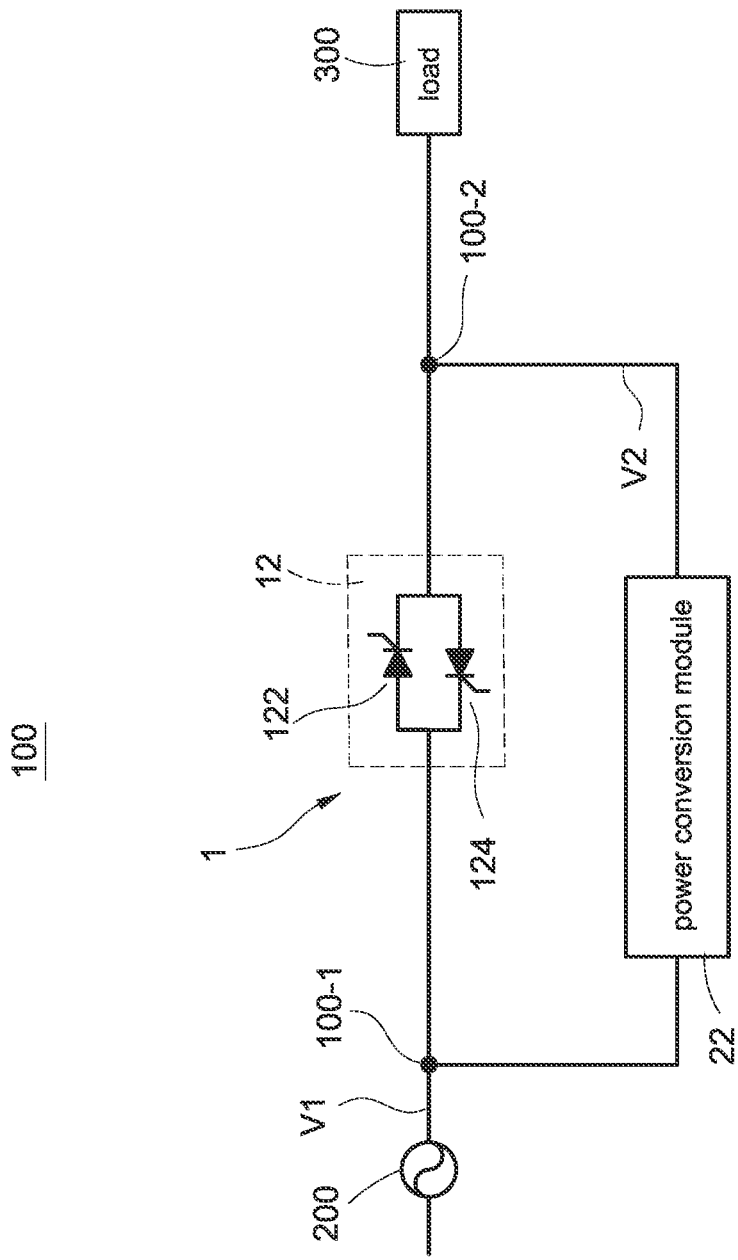
FIG. 1 is a block circuit diagram of a conventional uninterruptible power apparatus.

Reference will now be made to the drawing figures to describe the present disclosure in detail. It will be understood that the drawing figures and exemplified embodiments of present disclosure are not limited to the details thereof.

Figure 2:
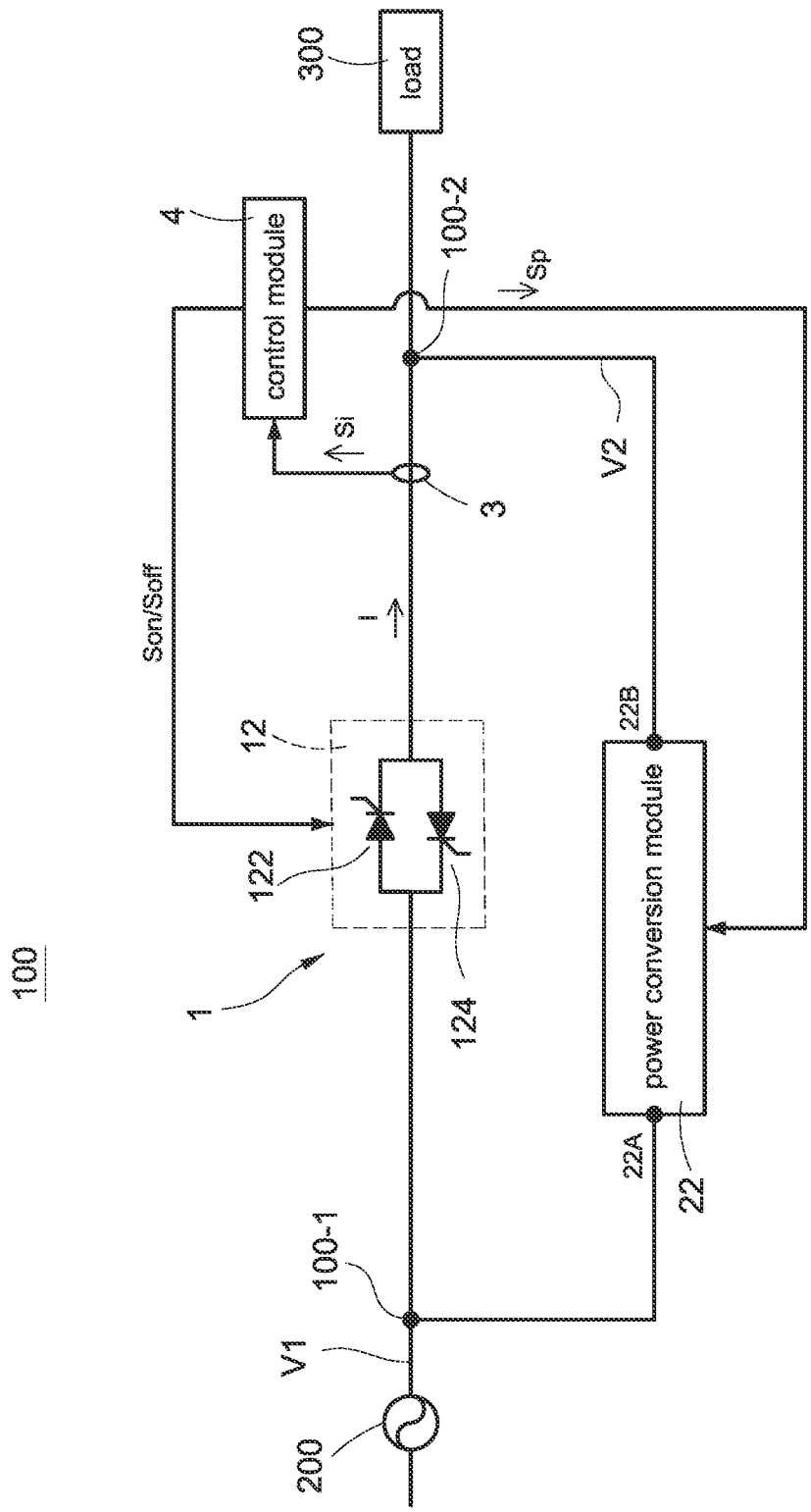
FIG. 2 is a block circuit diagram of an uninterruptible power apparatus with a function of forced disconnection path according to the present disclosure.

Please refer to FIG. 2, which shows a block circuit diagram of an uninterruptible power apparatus with a function of forced disconnection path according to the present disclosure, and also refer to FIG. 1. The uninterruptible power apparatus 100 is configured (coupled) between a grid 200 and a load 300, and includes a grid terminal 100-1 and a load terminal 100-2. The grid terminal 100-1 is coupled to the grid 200 to receive a first voltage V1 provided by the grid 200. The load terminal 100-2 is coupled to the load 300 to provide power electricity and supply power to the load 300 so as to maintain the stable and normal operation of the load 300. The uninterruptible power apparatus 100 further includes a bypass path 1, at least one power conversion module 22, a current detection unit 3, and a control module 4. One terminal of the bypass path 1 is coupled to the grid 200 through the grid terminal 100-1, and the other terminal of the bypass path 1 is coupled to the load 300 through the load terminal 100-2. The bypass path 1 includes at least one switch unit 12, and the switch unit 12 is connected in series on the bypass path 1. The switch unit 12 includes a first thyristor 122 and a second thyristor 124, and the first thyristor 122 and the second thyristor 124 are connected in anti-parallel. The bypass path 1 receives the first voltage V1 through the grid terminal 1001, and transmits the first voltage V1 to the load terminal 100-2 through the switch unit 12 to supply power to the load terminal 100-2.

Take one power conversion module 22 as an example. The power conversion module 22 includes an input terminal 22A and an output terminal 22B. The input terminal 22A is coupled to the grid terminal 100-1 and receives the first voltage V1, and the output terminal 22B is coupled to the load terminal 100-2. The power conversion module 22 converts the first voltage V1 into a second voltage V2, and the second voltage V2 is provided to supply power to the load 300. In one embodiment, by using some sensors or detection units (not shown), the input voltage at the input terminal 22A, the output voltage at the output terminal 22B, the input current flowing through the input terminal 22A, and/or the output current flowing through the output terminal 22B can be detected. The detected voltages and/or currents can be used for feedback control. The current detection unit 3 is coupled between the load terminal 100-2 and the switch unit 12, and is used to detect a current I flowing through the bypass path 1 to provide a current signal S1. The control module 4 is coupled to the current detection unit 3 and the power conversion module 22, receives the current signal S1, and realizes a magnitude and a current direction of the current I according to the received current signal S1. Specifically, the control module 4 determines whether the first voltage V1 is abnormal by detecting the grid terminal 100-1, or determines or realizes whether the first voltage is abnormal by receiving a detection signal provided from an external apparatus, such as a system controller (not shown).

When the first voltage V1 is normal, the uninterruptible power apparatus 100 can operate in a high-efficiency mode. The control module 4 provides a turned-on signal Son to control turning on the switch unit 12 (that is, turning on the first thyristor 122 and the turning on the second thyristor 124) so that the first voltage V1 is provided to the load 300 through the bypass path 1. In this condition, the power conversion module 22 may stand by without operating, or the power conversion module 22 may also perform harmonic compensation for the load 300.

When the first voltage V1 is abnormal, the control module 4 performs a function of forced disconnection path to the uninterruptible power apparatus 100, and then supplies power to the load 300 after the forced disconnection path. Since when there is current flowing through the thyristor, the thyristor cannot be turned off quickly, when the first voltage V1 is abnormal, even if the control module 4 controls the first thyristor 122 and the second thyristor 124 to be turned off by providing a turned-off signal Soff, usually one of the thyristors still has current flowing and cannot be quickly turned off so that the bypass path 1 is turned off too slowly. For this reason, it is necessary to provide a reverse-biased voltage for the thyristor that has not been turned off so that the thyristor can be quickly turned off. Accordingly, the main purpose and effect of the present disclosure is that when the first voltage V1 is abnormal, the control module 4 is used to control the power conversion module 22 to provide a reverse-biased voltage to the thyristor that has not been turned off so as to quickly turn off the thyristor.

Specifically, when the first voltage V1 is abnormal, the control module 4 provides the turned-off signal Soff to the first thyristor 122 and the second thyristor 124 so as to ensure that the thyristors will not be triggered on. Afterward, the control module 4 transmits a polarity Sp (or called a polarity information) of the current signal S1 to the power conversion module 22. After the power conversion module 22 receives the polarity Sp of the current signal S1, the power conversion module 22 generates a compensation amount according to the polarity Sp, and generates an output voltage command according to the compensation amount and an input voltage at the input terminal 22A or an output voltage at the output terminal 22B. Therefore, the second voltage V2 generated by the corresponding output voltage command may be used to reversely bias the thyristor that has not been turned off to ensure that the bypass path 1 is successfully disconnected during the abnormality cycle (period) of the AC voltage. In addition, since the entire uninterruptible power apparatus 100 does not have additional circuit components or control circuits for quickly turning off the switch unit 12, and it only needs to use the detection and control of the control module 4 and the power conversion module 22, thereby saving circuit volume without additional circuit costs.

In particular, the present disclosure combines the advantages of closed-loop control and open-loop control, which will be further explained below. If the closed-loop control is used to detect and control the current of the thyristor to drop to zero, a current sensor with a high frequency bandwidth will be required, which is expensive and usually has slower dynamic response or risks of instability. If the voltage is generated based on the polarity of the current flowing through the thyristor and the reference sinusoidal wave, sometimes the current of the thyristor cannot be blocked. That is because when the grid voltage is abnormal, it is usually accompanied by phase shift or harmonics, thereby causing the thyristor to fail to be turned off. The present disclosure is controlled according to the polarity of the current flowing through the thyristor and the present voltage at the input terminal or output terminal of the power conversion module. Since it only needs to acquire the current directionality without using high-frequency current sensor, and the actual voltage information is used, the thyristor can be successfully turned off once the grid voltage has harmonics.

After the above-mentioned forced turned-off stage, the first thyristor 122 and the second thyristor 124 are both turned off, and the power conversion module 22 operates in the uninterrupted power supply mode, that is, the second voltage V2 provided by the power conversion module 22 corresponds to the first voltage V1 under the normal condition to provide backup (redundant) power to the load 300. In one embodiment, the normality of the first voltage V1 represents the voltage amplitude, phase, and frequency of the AC voltage that are within the predetermined range in compliance with the specification. It may be slightly tolerant of some harmonic distortion or amplitude instability, but it still meets the standards required for the operation of the load 300. On the contrary, the abnormality of the first voltage V1 may indicate that the voltage amplitude, phase, and frequency of the AC voltage do not meet the specifications. The possible causes are that the grid 200 is not stable enough, the components are poorly connected, the harmonic distortion is too large, or the grid 200 is out of power (electricity disconnection).

Figure 3A:
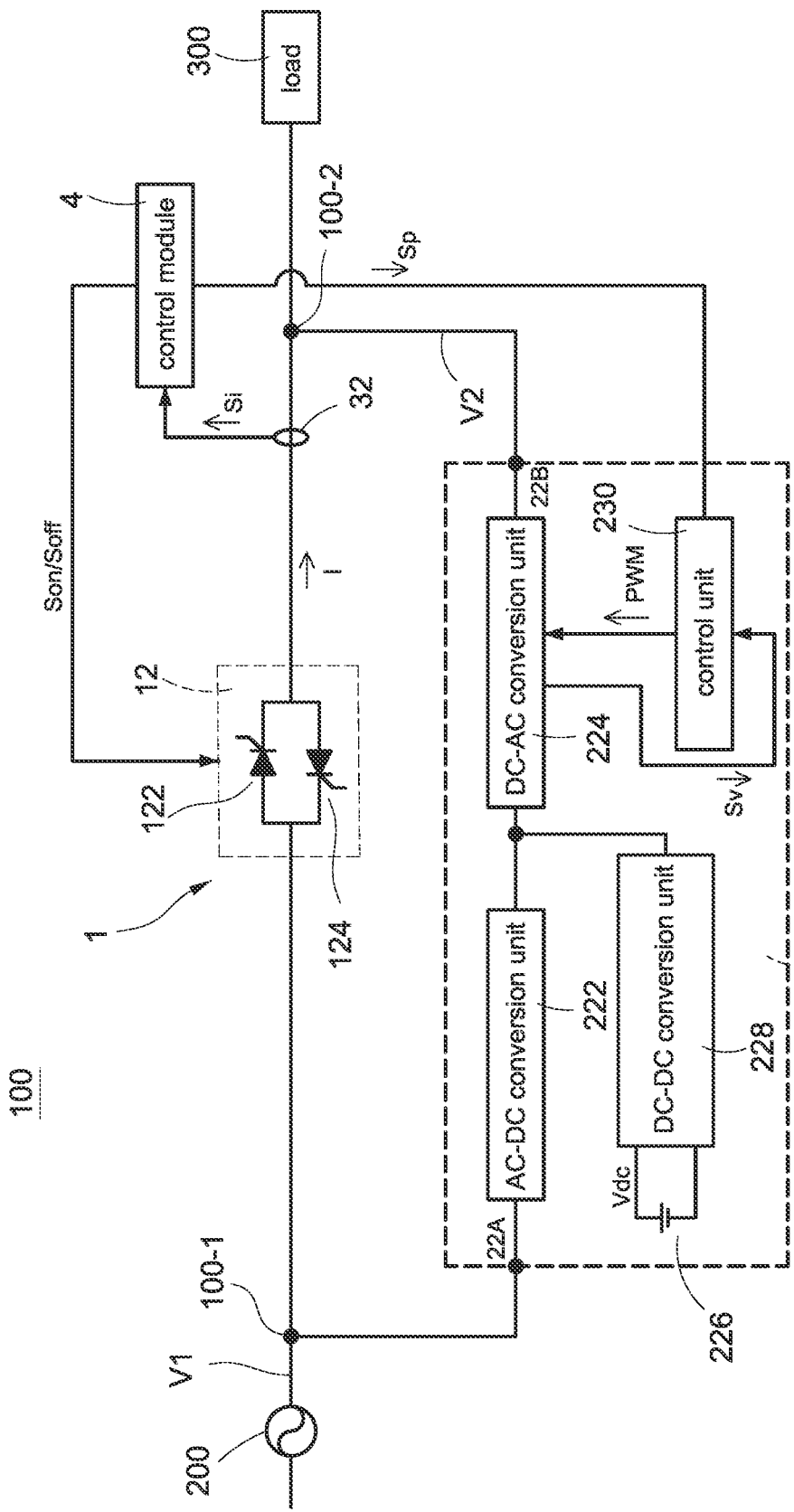
FIG. 3A is a block circuit diagram of a single-phase uninterruptible power apparatus with a function of forced disconnection path according to the present disclosure.

Please refer to FIG. 3A, which shows a block circuit diagram of a single-phase uninterruptible power apparatus with a function of forced disconnection path according to the present disclosure, and also refer to FIG. 2. Since the uninterruptible power apparatus 100 is applied to a single-phase power system, the bypass path 1 is a single-phase circuit path. The group number of switch unit 12 is one corresponding to the phase number of the power system, and one-group switch unit 12 is connected in series on the single-phase circuit path. Take one power conversion module 22 as an example, the power conversion module 22 includes an AC-DC conversion unit 222, a DC-AC conversion unit 224, an energy storage unit 226, and a control unit 230. The AC-DC conversion unit 222 is coupled to the grid terminal 100-1, and converts the first voltage V1 into a DC voltage Vdc. The DC-AC conversion unit 224 is coupled to the AC-DC conversion unit 222, and converts the DC voltage Vdc into the second voltage V2. The energy storage unit 226 (for example, but not limited to a battery) is coupled between the AC-DC conversion unit 222 and the DC-AC conversion unit 224, and stores the DC voltage Vdc. The power conversion module 22 further includes a DC-DC conversion unit 228, and the DC-DC conversion unit 228 is coupled to the AC-DC conversion unit 222, the DC-AC conversion unit 224, and the energy storage unit 226. The DC-DC conversion unit 228 converts the DC voltage Vdc stored in the energy storage unit 226 so that the converted DC voltage Vdc is suitable for the DC-AC conversion unit 224 to convert the second voltage V2.

The control unit 230 is coupled to the control module 4 and the DC-AC conversion unit 224. Besides the polarity Sp of the current signal S1, the control unit 230 further receives detection signals corresponding to the voltages at the input terminal 22A and at the output terminal 22B and the currents flowing through the input terminal 22A and through the output terminal 22B so as to correspondingly control the DC-AC conversion unit 224. Specifically, the control unit 230 receives a voltage signal Sv corresponding to an input voltage at the input terminal 22A or an output voltage at the output terminal 22B, and generates a compensation amount according to the polarity Sp. Furthermore, the control unit 230 generates the output voltage command according to the compensation amount and the voltage signal Sv and provides a PWM (pulse width modulation) signal PWM to control the DC-AC conversion unit 224 according to the output voltage command. Since one of the first thyristor 122 and the second thyristor 124 may be in a conduction (turned-on) state, the actual voltage on the bypass path 1 can be acquired by detecting the voltage signal Sv at the input terminal 22A or at the output terminal 22B so that the output voltage of the DC-AC conversion unit 224 is controlled to turn off the first thyristor 122 or the second thyristor 124. In particular, the control unit 230 may be a controller that individually controls the DC-AC conversion unit 224, or may additionally include a controller that controls the AC-DC conversion unit 222 and the DC-DC conversion unit 228. In order to focus on describing the main features of the present disclosure, the figure only shows that the control unit 230 provides the PWM signal PWM to control the DC-AC conversion unit 224. In addition, all units of the power conversion module 22 are not limited to be integrated in the same accommodating space.

When the first voltage V1 is normal, the control module 4 provides the turned-on signal Son to control turning on the switch unit 12, and the first voltage V1 is provided to the load 300 through the switch unit 12. The control unit 300 controls the AC-DC conversion unit 222 and the DC-DC conversion unit 228 to convert the first voltage V1 into the DC voltage Vdc so as to charge the energy storage unit 226. When the first voltage V1 is normal, the control unit 230 controls the AC-DC conversion unit 244 to stand by so as to save the power consumption of the power conversion module 22. Alternatively, the control unit 230 controls the DC-AC conversion unit 224 to perform harmonic compensation for the load 300.

When the first voltage V1 is abnormal, the forced turned-off stage is activated (started). The control module 4 provides the turned-off signal Soff to the first thyristor 122 and the second thyristor 124 to ensure that the thyristors will not be triggered on again, and correspondingly transmits the polarity Sp to the control unit 230 according to the current signal S1 provided by the current detection unit 3. The control unit 230 generates the compensation amount according to the polarity Sp, generates the output voltage command according to the compensation amount and the voltage signal Sv, and provides the PWM signal PWM to control the DC-AC conversion unit 224 according to the output voltage command. The DC-AC conversion unit 224 converts the DC voltage Vdc into the second voltage V2 (at this stage, the second voltage V2 is the voltage in response to the output voltage command) according to the PWM signal PWM to provide the reverse-biased voltage for the thyristor that has not been turned off so that the thyristor can be quickly turned off. At the forced turned-off stage of the thyristor, the output voltage of the DC-AC conversion unit 224 (i.e., the second voltage V2) basically responds to the output voltage command, unless the voltage command exceeds the upper limit of the pulse width modulation, there will be a little difference. Finally, when the first thyristor 122 and the second thyristor 124 are both turned off, the control unit 230 operates in an uninterrupted power supply mode to control the output voltage of the DC-AC conversion unit 224 (i.e., the second voltage V2) to an AC sinusoidal wave to provide stable power supply to the load 300.

Figure 3B:
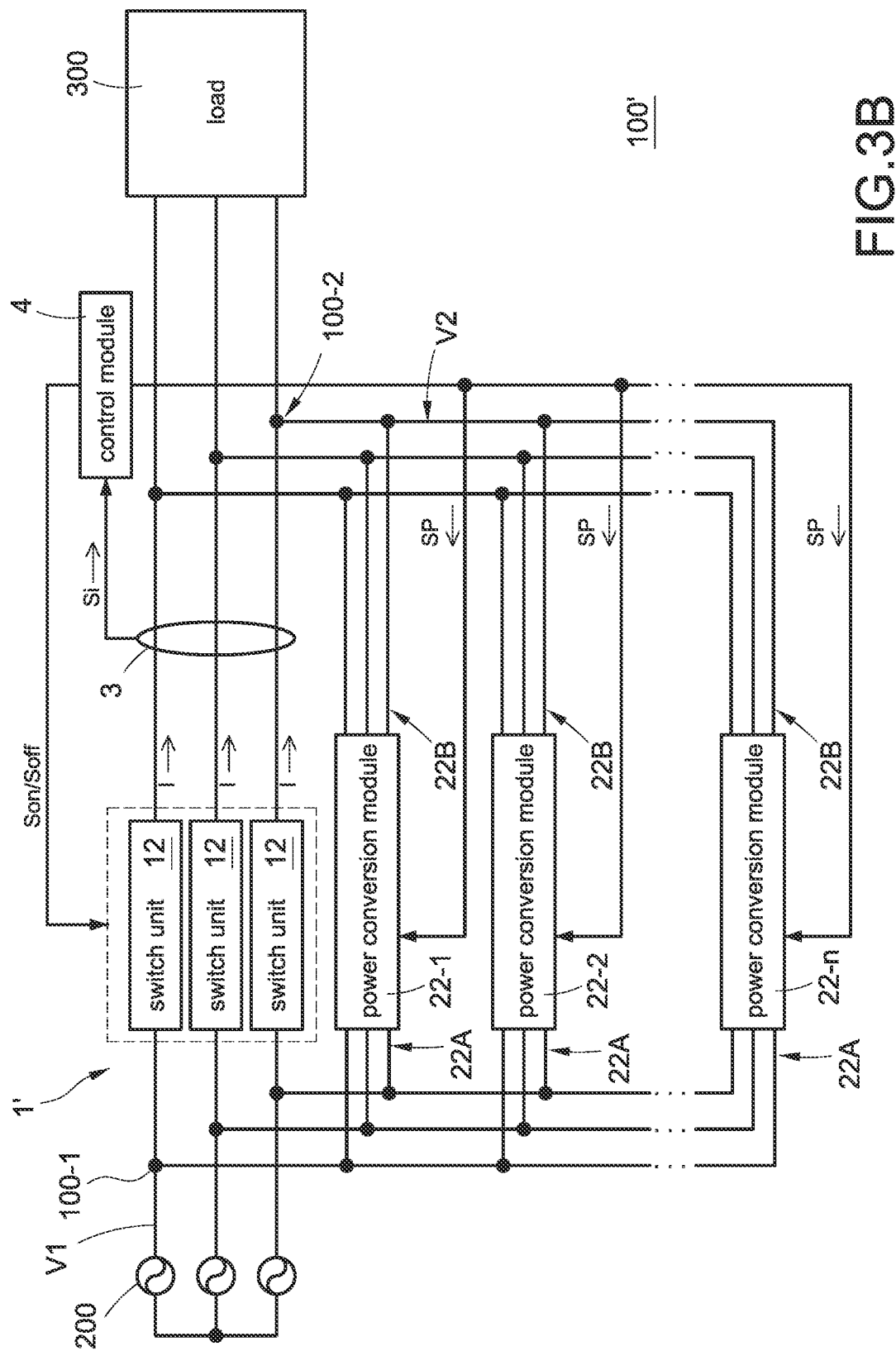
FIG. 3B is a block circuit diagram of a three-phase uninterruptible power apparatus with a function of forced disconnection path according to the present disclosure.

Please refer to FIG. 3B, which shows a block circuit diagram of a three-phase uninterruptible power apparatus with a function of forced disconnection path according to the present disclosure, and also refer to FIG. 2 to FIG. 3A. Since the uninterruptible power apparatus 100' is applied to a three-phase power system, the bypass path 1' is a three-phase circuit path. The group number of switch unit 12 is three corresponding to the phase number of the power system, and each group is connected in series to one phase of the three-phase circuit path. Since the power of the three-phase uninterruptible power apparatus is usually large, multiple power conversion modules 22-1 to 22-n may be connected in parallel, but it is not limited to this. The difference between each power conversion module 22-1 to 22-n and the power conversion module 22 in FIG. 3A is that the input terminal and the output terminal of the power conversion module 22-1 to 22-n are three-phase AC power terminals, and each power conversion module 22-1 to 22-n may include the circuits shown in FIG. 3A, including the AC-DC conversion unit 222, the DC-AC conversion unit 224, the energy storage unit 226, the control unit 230, and so on. In order to detail the key points shown in this figure, the power conversion modules 22-1 to 22-n are represented by a single box.

The difference between the single-phase system shown in FIG. 3A and the three-phase system shown in FIG. 3B is that the voltage of the grid 200 (i.e., the first voltage V1) is a three-phase AC voltage, and therefore the voltage, phase, and current direction of each phase at the same time will be different. When the first voltage V1 is abnormal and the control module 4 provides the turned-off signal Soff to turn off the first thyristor 122 and the second thyristor 124, since the current direction of each phase is not the same, the control module 4 transmits the polarity Sp to the control unit 230 of each power conversion module 22-1 to 22-n according to the current direction of each phase current. Accordingly, the output voltage command may be generated corresponding to the respective conditions of each phase, and the second voltage V2 that turns off the remaining thyristor is provided to ensure that the bypass path 1 is successfully disconnected when the first voltage V1 is abnormal.

Figure 4:
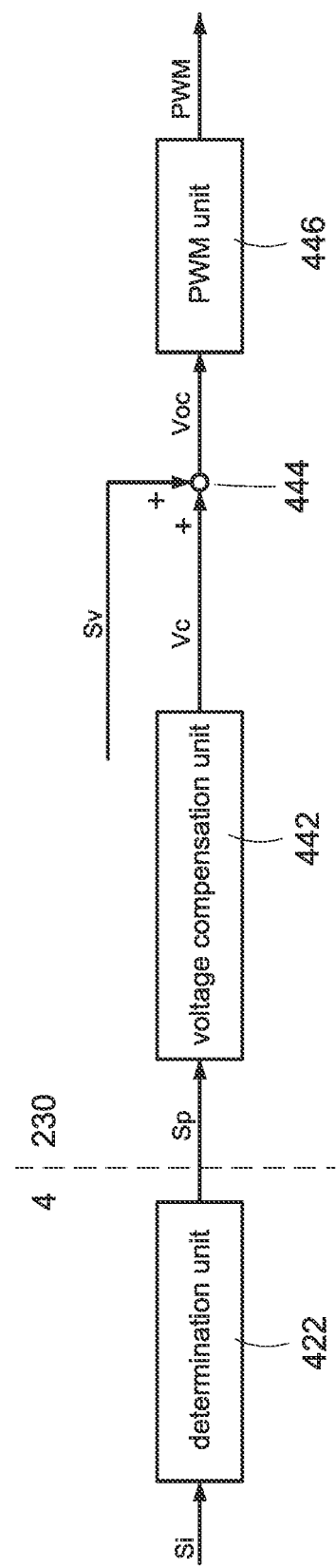
FIG. 4 is a block circuit diagram of a control module with a function of forced disconnection path according to the present disclosure.

Please refer to FIG. 4, which shows a block circuit diagram of a control module with a function of forced disconnection path according to the present disclosure, also refer to FIG. 2 to FIG. 3B. The control module 4 includes a determination unit 422, and the determination unit 422 is coupled to the current detection unit 3. The determination unit 422 determines a current direction of the current I flowing through the bypass path 1 according to the current signal S1 provided by the current detection unit 3 to correspondingly provide the polarity Sp of the current signal S1. The control unit 230 includes a voltage compensation unit 442, an adder 444, and a PWM unit 446. The voltage compensation unit 442 is coupled to the determination unit 422. When the first voltage V1 is abnormal, the voltage compensation unit 442 correspondingly provides compensation amount Vc according to the polarity Sp. The control unit 230 may be implemented by using an analog circuit, or by using a microcontroller (MCU) or a digital signal processor (DSP).

Specifically, when the determination unit 422 determines that the current direction is from the grid terminal 100-1 to the load terminal 100-2 according to the current signal S1, the determination unit 422 transmits the polarity Sp of positive (for example, but not limited to, "1" representing the positive polarity is transmitted) to the voltage compensation unit 442, on the contrary, transmits the polarity Sp of negative (for example, but not limited to "−1" represent the negative polarity is transmitted) to the voltage compensation unit 442. The voltage compensation unit 442 generates the compensation amount Vc according to the polarity Sp of negative. The adder 444 is coupled to the voltage compensation unit 442, and provides the output voltage command Voc to the PWM unit 446 according to the compensation amount Vc and the voltage signal Sv (acquired at the input terminal 22A or the output terminal 22B of the power conversion module 22). The PWM unit 446 is coupled to the adder 444, and modulates the PWM signal PWM according to the output voltage command Voc to control the second voltage V2 outputted from the DC-AC conversion unit 224. In particular, the second voltage V2 is the sum of the compensation voltage corresponding to the compensation amount Vc and the voltage (i.e., the voltage at the input terminal 22A or the output terminal 22B of the power conversion module 22) corresponding to the voltage signal Sv. The second voltage V2 must reverse bias the thyristor that has not been turned off so as to forcibly turn off the switching unit 12 by a reverse-biased voltage (i.e., the second voltage V2). To further explain, the circuit block diagram of FIG. 4 represents the control block diagram of each phase. Take the single-phase system of FIG. 3A as an example, the voltage corresponding to the voltage signal Sv may be the L-phase voltage, and the polarity Sp is the polarity of the L-phase current. Take the three-phase system in FIG. 3B as an example, the voltage signal Sv is the voltage of each phase (for example, U-, V-, W-phase or R-, S-, T-phase), and the polarity Sp is the current polarity of each phase. The output voltage command of each phase can be generated to control the second voltage V2 outputted from the DC-AC conversion unit 224 to turn off the switch units 12 of each phase.

Figure 5:
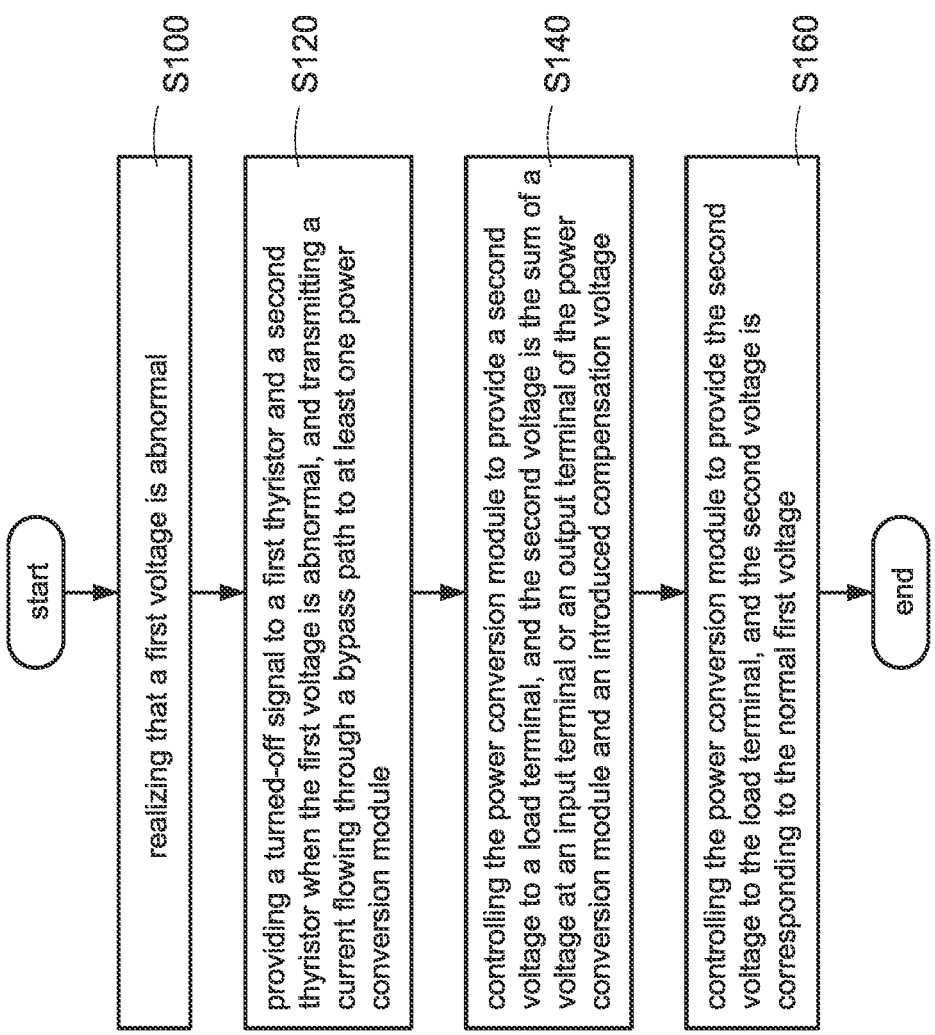
FIG. 5 is a flowchart of a method of forcing disconnection path of an uninterruptible power apparatus according to the present disclosure.

Please refer to FIG. 5, which shows a flowchart of a method of forcing disconnection path of an uninterruptible power apparatus according to the present disclosure, also refer to FIG. 2 to FIG. 4. The method of forcing disconnecting path includes steps as follows. First, realizing that a first voltage is abnormal (S100). In one embodiment, a control module 4 is used to detect a grid terminal 100-1 to determine whether the first voltage V1 is abnormal. Alternatively, the control module 4 is used to receive, for example, but not limited to, a detection signal provided from an external apparatus, such as a system controller (not shown) to determine or realize whether the first voltage V1 is abnormal. Afterward, providing a turned-off signal to a first thyristor 122 and a second thyristor 124 when the first voltage V1 is abnormal, and transmitting a polarity of a current flowing through a bypass path to at least one power conversion module (S120). In one embodiment, after the turned-off signal Soff is provided, a current detection unit 3 is used to detect a current I flowing through the bypass path 1 to provide a current signal S1. The control module 4 determines a current direction of the current I according to the current signal S1, and transmits the polarity Sp to the power conversion module 22 according to the current direction.

Afterward, controlling the power conversion module to provide a second voltage to the load terminal, and the second voltage is the sum of a voltage at an input terminal or an output terminal of the power conversion module and an introduced compensation voltage (S140). The power conversion module 22 includes an AC-DC conversion unit 222, a DC-AC conversion unit 224, an energy storage unit 226, and a control unit 230. When the first voltage V1 is normal, the AC-DC conversion unit 222 is controlled to convert the first voltage V1 into a DC voltage Vdc. The DC voltage Vdc may be stored in a battery, or be converted into a suitable stored voltage by the DC-DC conversion unit 228 and stored in the battery.

The preferred embodiment of step (S140) is that: the control unit 230 is used to receive the polarity Sp to generate a compensation amount Vc according to the polarity Sp. The control unit 230 further receives a voltage signal Sv, which is acquired by detecting the voltage at the input terminal 22A or the voltage at the output terminal 22B of the power conversion module 22 through an additional detection unit. The control unit 230 generates an output voltage command Voc according to the compensation amount Vc and the voltage signal Sv, and modulates a PWM signal PWM according to the output voltage command Voc. The PWM signal PWM is provided to the DC-AC conversion unit 224 to control the DC-AC conversion unit 224 converting the DC voltage Vdc into the second voltage V2. In particular, the compensation amount Vc is a compensation voltage corresponding to the additional introduced compensation voltage. Accordingly, the sum voltage can be used to reverse bias the thyristor that has not been turned off so as to quickly turn off the switching unit 12 to ensure that the bypass path 1 is successfully disconnected during the abnormality cycle (period) of the AC voltage.

Finally, controlling the power conversion module to provide the second voltage to the load terminal, and the second voltage is corresponding to the normal first voltage (i.e., the first voltage is normal) (S160). In one embodiment, after the control module 4 detects and determines that the first thyristor 122 and the second thyristor 124 are both turned off, the control module 4 provides a signal to notify the control unit 230 of the power conversion module 22. The control unit 230 operates in an uninterrupted power supply mode, that is, the control unit 230 controls the second voltage V2 provided by the DC-AC conversion unit 224 to correspond to the normal first voltage V1, such as an AC voltage, to provide backup (redundant) power to the load 300. In one embodiment, for the detailed implementation of the above-mentioned steps (S100) to (S160), reference may be made to the detailed description of FIG. 2 to FIG. 4 of the present disclosure, and the detail (description) is omitted here for conciseness. In one embodiment, the step-by-step limitation described in FIG. 5 may only be implemented using the components shown in FIG. 2 to FIG. 4 in the present disclosure. Therefore, circuit components, control software, etc. that can achieve the steps in FIG. 5 should be included in the scope of the present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An uninterruptible power apparatus with a function of forced disconnection path coupled between a grid and a load, the uninterruptible power apparatus comprising:
   a bypass path coupled to the grid through a grid terminal and coupled to the load through a load terminal; the bypass path comprising at least one switch unit, and the at least one switch comprising a first thyristor and a second thyristor connected in anti-parallel; the bypass path configured to receive a first voltage through the grid terminal and transmit the first voltage to the load terminal,
   at least one power conversion module comprising an input terminal and an output terminal; the input terminal coupled to the grid terminal, and the output terminal coupled to the load terminal,
   a current detection unit coupled to the bypass path, and configured to detect a current flowing through the bypass path to correspondingly transmit a current signal, and
   a control module coupled to the current detection unit and the at least one power conversion module,
   wherein when the first voltage is abnormal, the control module is configured to provide a turned-off signal to the first thyristor and the second thyristor, and transmit a polarity of the current signal to the at least one power conversion module; the at least one power conversion module is configured to generate a compensation amount according to the polarity, and generate an output voltage command according to the compensation amount and an input voltage at the input terminal or an output voltage at the output terminal.

2. The uninterruptible power apparatus as claimed in claim 1, wherein the at least one power conversion module comprises:
   an AC-DC conversion unit coupled to the grid terminal, and configured to convert the first voltage into a DC voltage,
   a DC-AC conversion unit coupled to the AC-DC conversion unit and the load terminal, and configured to convert the DC voltage into a second voltage, and
   a control unit coupled to the DC-AC conversion unit, and configured to generate the output voltage command according to the polarity and a voltage signal corresponding to the input voltage or the output voltage, and provide a PWM signal to control the DC-AC conversion unit according to the output voltage command.

3. The uninterruptible power apparatus as claimed in claim 2, wherein the control unit is configured to control the second voltage converted by the DC-AC conversion unit to be sum of a compensation voltage corresponding to the compensation amount and a voltage according to the PWM signal.

4. The uninterruptible power apparatus as claimed in claim 2, wherein the control unit comprises:
   a voltage compensation unit coupled to the control module, and configured to provide the compensation amount according to the polarity,
   an adder coupled to the voltage compensation unit, and configured to provide the output voltage command according to the compensation amount and the voltage signal, and a PWM unit coupled to the adder, and configured to provide the PWM signal according to the output voltage command.

5. The uninterruptible power apparatus as claimed in claim 1, wherein the control module comprises:
a determination unit coupled to the current detection unit, and configured to determine a current direction of the current according to the current signal, and transmit the polarity to the at least one power conversion module according to the current direction.

6. The uninterruptible power apparatus as claimed in claim 5, wherein when the determination unit determines that the current direction is from the grid terminal to the load terminal according to the current signal, the polarity of positive is transmitted; when the determination unit determines that the current direction is from the load terminal to the grid terminal according to the current signal, the polarity of negative is transmitted.

7. The uninterruptible power apparatus as claimed in claim 1, wherein the bypass path is a three-phase circuit path, and the group number of the at least one switch unit is three, and each group is connected in series to one phase of the three-phase circuit path.

8. The uninterruptible power apparatus as claimed in claim 1, wherein the bypass path is a single-phase circuit path, and the group number of the at least one switch unit is one, and the group is connected in series to the single-phase circuit path.

9. The uninterruptible power apparatus as claimed in claim 1, wherein the control module determines whether the first voltage is abnormal by detecting the grid terminal, or determines or realizes whether the first voltage is abnormal by receiving a detection signal provided from an external apparatus.

10. The uninterruptible power apparatus as claimed in claim 7, wherein the input terminal and the output terminal of the at least one power conversion module are three-phase AC power terminals.

11. A method of forcing disconnection path of an uninterruptible power apparatus, the uninterruptible power apparatus comprising a bypass path and at least one power conversion module, and the bypass path coupled to a grid and a load; the bypass path comprising at least one switch unit, and the at least one switch unit comprising a first thyristor and a second thyristor connected in anti-parallel; the bypass path configured to receive a first voltage through a grid terminal and transmit the first voltage to a load terminal, the method of forcing disconnection connecting path comprising steps of:
(a) realizing that the first voltage is abnormal,
(b) providing a turned-off signal to the first thyristor and the second thyristor according to the abnormality of the first voltage, and transmitting a polarity of a current flowing through the bypass path to the at least one power conversion module,
(c) controlling the at least one power conversion module to provide a second voltage to the load terminal, and the second voltage is sum of a voltage at an input terminal or at an output terminal of the at least one power conversion module and a compensation voltage, and
(d) controlling the at least one power conversion module to provide the second voltage to the load terminal, and the second voltage is corresponding to the first voltage under normality.

12. The method of forcing disconnection path as claimed in claim 11, wherein the step (b) further comprises steps of:
(b1) receiving a current signal correspondingly provided by the current flowing through the bypass path detected by a current detection unit, and
(b2) providing the polarity of the current signal to the at least one power conversion module.

13. The method of forcing disconnection path as claimed in claim 11, wherein the at least one power conversion module comprises an AC-DC conversion unit and a DC-AC conversion unit, and the AC-DC conversion unit is configured to convert the first voltage into a DC voltage when the first voltage is normal, wherein the step (c) further comprises steps of:
(c1) receiving the polarity by the at least one power conversion module,
(c2) generating a compensation amount according to the polarity, and generating an output voltage command according to the compensation amount and a voltage signal corresponding to the voltage, and
(c3) controlling the DC-AC conversion unit to convert the DC voltage into the second voltage according to the output voltage command,
wherein the compensation amount is corresponding to the compensation voltage additionally introduced.

14. The method of forcing disconnection path as claimed in claim 13, wherein the step (d) further comprises steps of:
(d1) detecting and determining that the first thyristor and the second thyristor are both turned off, and
(d2) controlling the DC-AC conversion unit to convert the DC voltage into the second voltage.

15. The method of forcing disconnection path as claimed in claim 11, wherein the step (a) further comprises a step of:
(a1) determining whether the first voltage is abnormal by detecting the grid terminal, or determining whether the first voltage is abnormal by receiving a detection signal provided by an external apparatus.

* * * * *